Dec. 22, 1936.   E. E. METCALF   2,065,143
TAPE COMPASS
Filed Jan. 29, 1934
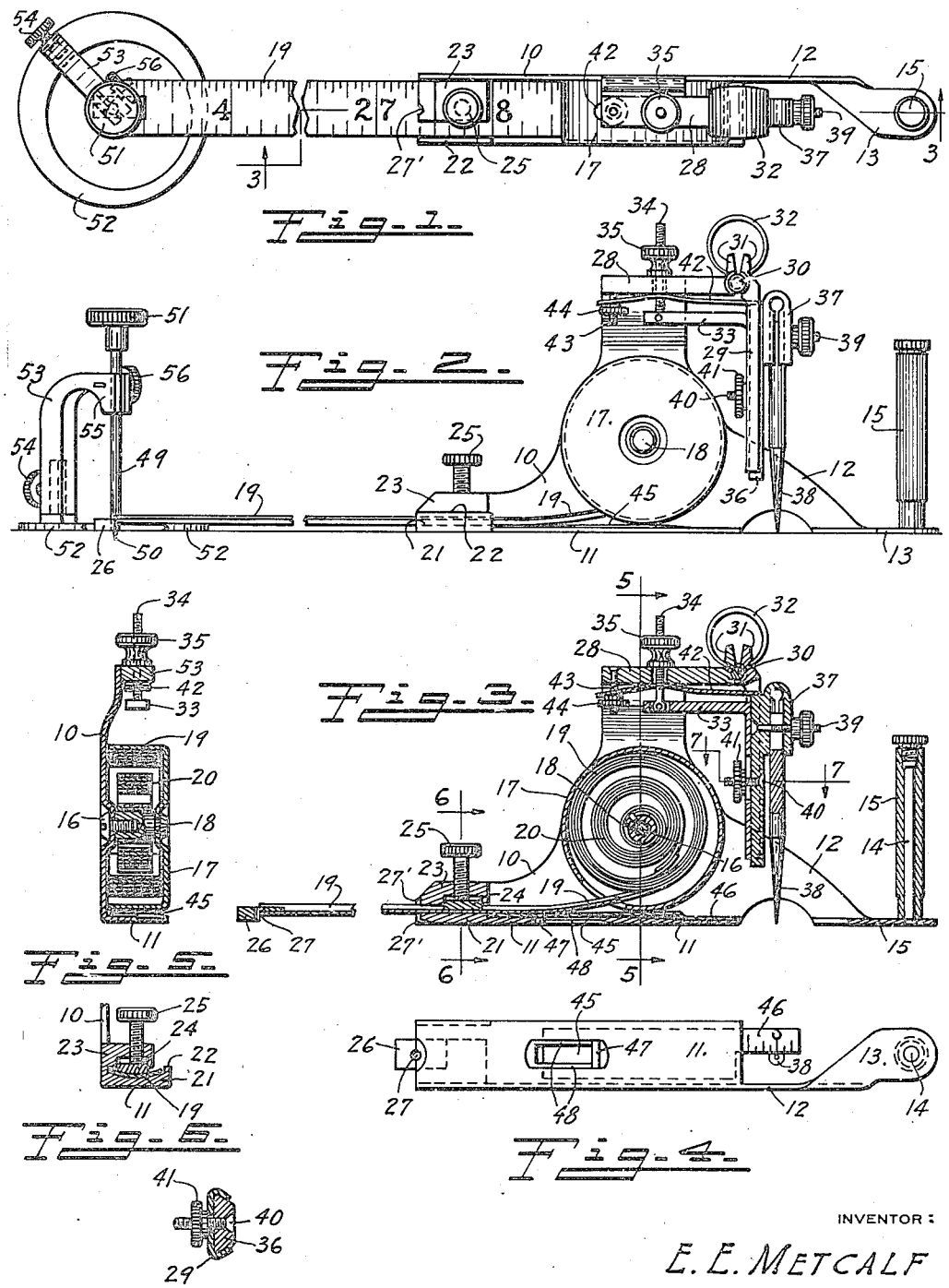
INVENTOR:
E. E. METCALF
BY David O. Barnell
ATTORNEY.

Patented Dec. 22, 1936

2,065,143

UNITED STATES PATENT OFFICE 2,065,143

TAPE COMPASS

Edgar E. Metcalf, Moville, Iowa

Application January 29, 1934, Serial No. 708,765

6 Claims. (Cl. 33—158)

My invention relates to geometrical instruments, and especially to instruments of the beam-compass or trammel type. It is the object of my invention to provide an instrument of this type in which the connecting means between the working points is subject to lengthening and shortening throughout a wide range of adjustment without at any time having a material extension beyond the working points. A further object of my invention is to provide an instrument of this kind wherein the connecting means between the working points is of such flexibility as to enable the rolling thereof into a coil, while having a definite and self-maintained rigidity when in normal extended or rectilinear formation. A further object is to provide an instrument of this class wherein the means connecting the working points extends substantially in a direct line between the said points, and in which the operating stress in said connecting means tends to prevent deformations thereof. A further object is to provide means for indicating accurately the distance between the working points of an instrument of this class, whereby the same may be used directly for the measurement of distances, and for marking-off and laying-out operations requiring accurate fixation of distances between points to which the working points of the instrument may be applied. A further object is to provide, for an instrument of this class, an improved working-point comprising a fixed-center post or stem and a support for holding said stem adjustably in vertical positions, without damaging engagement with the surface on which the instrument is being used. Other objects of my invention will appear hereinafter.

In the accompanying drawing Fig. 1 is a plan view of an instrument embodying my invention, Fig. 2 is a front view of the same, Fig. 3 is a vertical section on the line 3—3 of Fig. 1, Fig. 4 is a bottom view of the main head, Fig. 5 is a detail transverse section on the line 5—5 of Fig. 3, Fig. 6 is a detail transverse section on the line 6—6 of Fig. 3, and Fig. 7 is a detail horizontal section on the line 7—7 of Fig. 3.

In carrying out my invention according to the illustrated embodiment thereof I provide a main head of which the frame is formed by a vertical plate 10 having at its lower edge a horizontal base-flange 11. At one end of the plate 10 an arch portion 12 extends out from the body thereof and carries the foot 13 which is alined with but spaced longitudinally from the base-flange 11. To said foot 13 is affixed a vertical post 14, upon which the tubular handle 15 is mounted revolubly. To the central portion of the frame-plate 10, above the base-flange 11, the cup-shaped tape-housing 17 is secured by means of a screw 16 extended through the plate into the center-post 18 of the housing. The edges of the housing-cup have short tongues extending into shallow recesses in the side of the plate 10, and at the lower side of the cup there is a slot in the cylindrical wall for the passage of the tape 19. The inner end of the coil of tape within the housing 17 is connected with the outer end of a coiled flat spring 20, and the inner end of said spring is secured to the center-post 18. From the outer turn of the coiled portion thereof the tape extends through the slot of the housing, substantially parallel with the base-flange, over a seat 21 at the end of the base-flange. At the front edge of said seat, opposite the plate 10, an upwardly extending lip 22 engages the edge of the tape to normally prevent lateral displacement of the tape from the seat. From the frame-plate 10 a lug 23 extends forwardly above the seat 21 in spaced relation thereto, the width of said lug being less than that of the seat, so that between the lug and the lip 22 a slot or opening is formed through which one edge of the tape may be observed, as shown in Fig. 1. The lower side of the lug 23 is recessed to receive the loose clamp-plate 24, and a screw 25 extends vertically through a threaded opening in said lug, whereby the clamp-plate may be forced downwardly upon the tape to hold the same in fixed position upon the seat 21. Adjoining the outer end of the clamp-lug 23 the upper side thereof is bevelled as shown, to form an edge closely adjoining the graduated upper side of the tape, for convenience in reading the graduations with reference to said edge as a gage. Secured on the free end of the tape is a terminal-block 26, having therein a small vertical cylindrical opening 27, of which the center is in accurate register with the terminal graduation of the tape. The lower portion of the block 26 is adapted to engage the outer end of the seat 21 as a stop for limiting retraction of the tape, and said end of the seat and of the clamp-lug 23 have therein semi-cylindrical notches 27' adapted to register with the opening 27 of the terminal-block, when the tape is fully retracted as shown in Fig. 4. The tape 19 is preferably of the type which is made of spring-steel, and dished or bowed transversely, whereby to have a marked tendency to assume and maintain a rigid rectilinear formation; and the seat 21 and clamp-plate 24 are curved to conform with the tape, as shown. The spring 20, to which the coil end of the tape is connected, is preferably so proportioned as to substantially counterbalance the expansive force of the coiled portion of the tape within the housing, whereby the normal tendency of the tape-coil to expand and emerge from the housing is substantially neutralized, or reduced to an amount less than the frictional resistance to such movement. Thus, movement of the tape into or out of the housing may be effected by merely pushing or pulling upon the straight portion of the tape which protrudes from the seat 21.

The narrow upper portion of the frame-plate 10 has affixed thereto a bar 28 which is parallel with the base-flange 11 and extends longitudinally beyond the edge of the frame-plate, above the arch portion 12. To the projecting end of said bar 28 the upper end of a bar 29 is pivotally connected by means of a compass-joint 30, the joint-ends of the bars having upwardly extending lugs 31 which are engaged by a C-spring 32, and the force of said spring tending to swing the bar 29 outwardly, or from its normal perpendicular relation to the bar 28, to an obtuse angular relation therewith. An arm 33 is integral with the bar 29 and extends beneath the bar 28 in spaced and normally parallel relation thereto. A threaded stem 34 is connected pivotally with said arm 33, extending up loosely through an opening therefor in the bar 28, and upon the projecting upper portion of said stem is an adjusting-nut 35 which is pulled down against the bar 28 by the force of the C-spring 32, the arrangement being such that by turning said nut 35 the relation of the bar 29 to the frame may be varied minutely.

The depending arm 29 is provided in one side with a longitudinal dovetail groove in which is slidably disposed a dovetail plate 36 having at the outer side thereof a recessed split lug 37. The latter forms a socket for the slotted upper end of a working point member 38, which is retained removably in the split socket by means of the clamp-screw 39. The working-point may be, of course, a pencil, crayon, pen or the like, instead of the scriber or trammel-point shown. A clamp-screw 40 has its T-head seated in the plate 36, and the stem of the screw extended through a slot in the back of the arm or bar 29, against which the clamp-nut 41 may be tightened to hold the plate 36 in adjusted positions in the dovetail guide-groove. The socket-plate is pressed yieldingly downward by means of a flat spring 42 which is arranged beneath the bar 28 and has an end portion extending through a slot in the upper part of the bar 29 to engage the upper end of the said plate 36. An opening in the intermediate portion of said spring 42 fits loosely about the stem 34, and the adjacent end of the spring has an opening through which a fixed threaded stem 43 extends down from the bar 28, an adjusting-nut 44 being disposed upon the lower portion of said stem. The spring 42 is normally bowed upwardly at its intermediate portion and engages as a fulcrum the lower side of the bar 28 adjoining the stem 34, so that by turning the nut 44 to move the same along the stem 43, the tension of the spring, effective to press downwardly on the plate 36, may be varied as desired. When the clamp-nut 41 is loosened, the socket-plate 36 is free to move downwardly until the working point 38 engages the work at the surface on which the base-flange 11 and foot 13 rest, the amount of pressure exerted by the working point upon the surface being proportional to the adjusted tension of the spring 42. On the upper side of the base-flange 11 there is disposed slidably a thin plate 45 of spring metal, having at the end thereof a narrow finger 46 of which one edge is substantially in longitudinal register with the working point 38. In the base-flange 11 beneath the plate 45 is a rectangular slot of which the edges are beveled at the lower side, and a small rectangular button 47 has a head portion which fits slidably against the beveled longitudinal edges 48 of the slot in the base-flange, the intermediate portion of the button extending through the slot 10 and being secured to the plate 45, whereby the latter is held in place upon the base-flange. The upper surface of the base-flange has therein a shallow longitudinally tapering groove in which the finger 46 is received when the same is in the normal retracted position shown in Fig. 3. From said retracted position the sliding plate may be moved by pushing the button 47 longitudinally of the slot from one end thereof to the other, whereby to effect protrusion of the finger 46 into the space between the base-flange and foot 13, and adjoining the working point to form a gage therefor, as shown in Fig. 4. Upon the finger 46 are marked a series of graduations, a central one of which is marked "0" and shows a normal position for the working point. Preferably, the figures and graduations marked upon the tape 19 are so placed that when the working point 38 is in register with the central or "0" mark of the extended gage-finger, as shown in Fig. 4, the correct distance between said working point and the center of the opening 27 through the terminal-block 26 of the tape, will be shown at the gage-edge of the clamp-lug 23.

The second working point of the instrument has a cylindrical stem 49 adapted to fit rotatively within the opening 27 in the terminal-block 26 of the tape, and the actual point which engages the work may be a slender needle-point 50 on the lower end of the stem 49, as shown, for use on paper, wood, or other easily penetrable material; or for shop lay-out work there may be provided a conical point adapted to enter center-punch-marks in metal surfaces and the like. For many uses of the instrument, it is desirable that the stem 49 be associated with a holder for sustaining the same in vertical position. In the structure shown, the holder has a base-ring 52 of which the central opening is slightly eccentric, so that the ring is wider at one side than at the other. At the wide side of the base-ring, a short fixed post extends upwardly therefrom, and upon said post the curved standard 53 is secured detachably by means of a set-screw 54. The upper part of the standard 53 is curved to extend in over the center of the base-ring, and carries a split clamp-head 55 having a vertical passage for the stem 49, which may be gripped therein by means of the clamp-screw 56 extending transversely through the split head. A suitable head 51 is provided on the stem 49, for convenience in handling the same. The thickness of the base-ring 52 is preferably equal to the depth of the terminal-block 26 below the tape, whereby when the base-ring and said block 26 rest upon the same working surface, as shown in Fig. 2, the body of the tape may extend horizontally above the base-ring, parallel with the working surface, and but slightly spaced therefrom.

The operation of the described instrument will be easily apparent from the drawing and the foregoing description of structure. For describing circles or circular arcs, it is merely necessary to place the working point 50 at the desired center, loosen the tape-clamp screw 25, grasp the handle 15 and move the main head to place the working point 38 at any point on the desired circle or arc, tighten the clamp-screw 25, and strike the desired circle or portion thereof by swinging the head about the fixed-center stem 49, while grasping only the handle 15 and keeping a slight tension upon the tape. If it be desired to employ the tape for measuring accurately the distance between the working points, the gage-finger 46 may be first moved into extended position, the point 38 then moved to register with the "0" mark of said gage-finger, by suitable manipulation of the adjusting-nut 35, and the gage-finger then retracted from the arch-space, so that the relation of the point 38 to the work may be readily observed. After the adjustment of the point 38 to normal position, the graduation of the tape which registers with the bevelled gage-end of the clamp-lug 23, will show accurately the distance between the working points of the instrument. For example, at the adjustment shown in Fig. 1, the indicated distance between the working points is 27⅜. To obtain minor variations from a distance between the working points previously fixed by the tightening of the clamp-screw 25 onto the tape, the adjusting-nut 35 may be employed to shift the point 38 the desired amount in either direction from normal or "0" relation with the extended gage-finger 46, to thereby increase or decrease the tape-indicated distance by the amount indicated by the graduations on the gage-finger at that side of the "0" mark to which the point is shifted. Uniform light pressure of the point 38 upon the surface of the work may be secured by loosening the clamp-nut 41 and keeping the base-flange 11 and foot 13 engaged with the work-surface, whereby the pressure thereon of the point 38 will depend upon the tension of the spring 42, and said spring-tension being adjusted as desired, by use of the nut 44. If more forcible engagement of the point 38 with the work-surface is desired, the clamp-nut 41 may be tightened to hold the socket-plate at a position such that the working point will extend slightly below the plane of the bottom surface of the base-flange 11, and the working pressure of the point upon the surface will then be as imparted by the hand of the user upon the handle 15.

When the instrument is used upon a surface of material such as paper or wood, so that the working point 50 may readily penetrate the work-surface, the stem 49 may be adjusted vertically and clamped in the support-standard at a position such that only that part of the point 50 which is to penetrate the work-surface will extend below the plane of the base-ring 52. Thereafter the base-ring will prevent penetration of the work-surface to an excessive depth, while allowing such penetration as to prevent lateral displacement of the working point by the slight tension required upon the tape during use of the instrument, and the line of tension is so close to the working surface that there is very little tendency to displace the point by tilting of the support. When applying the instrument to the work, the terminal-block 26 of the tape may be temporarily moved up along the stem 49 to a position at which it will not obstruct observation of the point 50 by the user. During use of the instrument any tension applied to the tape tends to maintain normal formation, or to inhibit deformation, of the connecting means between the working points, since the line of tension is almost directly between the points at the working surface, whereas in ordinary beam-compasses and trammels the connecting beam is considerably spaced from the work-surface, and any tension between the working points has a marked tendency to distort the beam and cause variations in the spacing of the points. A further safeguard against accidental variations of distance between the working points, resides in the provision for each of the working points of a base-member adapted to rest upon the work-surface and to assure the retention of its respective point-member in the desired relation to the working surface, or perpendicular to said surface for the stem 49 and normally perpendicular for the member 38. By the use of the dished or transversely bowed spring-steel tape as the connecting means between the working points, prevention of deformations of said connecting means is further facilitated because of the inherent tendency for tape of this kind to maintain a rigid rectilinear formation. The use of the spring 20 for counterbalancing expensive coil-tension of the tape, and substantially neutralizing any tendency for the tape to change its relation to the housing-cup, facilitates rapid and convenient adjustment of the effective length of the tape, as the tape may be merely pushed into or pulled out of the housing to the desired position, and then clamped in the adjusted position without difficulty in holding the position while tightening the clamp-screw 25 to maintain the adjustment. Use of the gage-finger 46 for accurately determining the position of the working point relative to the gaging edge of the clamp-lug, facilitates accurate measurement of distances between the working points, while enabling small or micrometric adjustments of the distance by use of the point-adjusting nut 35.

Now, having described my invention, what I claim and desire to secure by Letters Patent is:

1. In an instrument of the class described, the combination with a tape, of a terminal-block secured on said tape and having a cylindrical opening therein, a point member having a stem adapted to fit slidably and revolubly in said opening of the terminal block, a support standard having a clamp-head adapted to hold said stem in vertically adjusted positions, and a base-member carrying said standard and having an open central portion in which the terminal-block of the tape is movable about the stem of the point member.

2. In an instrument of the class described, the combination with a working point member, and a tape connected with said point member and having graduations marked thereon in definite relation to the center of said point member; of a main head having a frame, a gage affixed to said frame, clamping means on said frame adapted to hold portions of said graduated tape in selected relations to said gage, a second working point member connected movably with said frame, means for adjusting the relation of said point member to the frame, and a gage-member positioned closely adjacent a working surface arranged to indicate a normal relation of said second working point member to said fixed gage including a graduated horizontal strip slidably received within the frame and positioned to move directly adjacent said second working point member.

3. In an instrument of the class described, a main head comprising a frame having a base portion, a point member mounted on said frame and having a working point disposed in operative relation to a working surface engaged by the base portion of the frame, means for resiliently attaching said point to the frame to cause a resilient pressure between the point and the working surface.

4. In an instrument of the class described, a main head comprising a frame having a base portion, a point member mounted on said frame and having a working point disposed in operative relation to a working surface engaged by the base portion of the frame, means for resiliently attaching said point to the frame to cause a resilient pressure between the point and the working surface, said means including a slidable plate attached to the point, a spring attached to the frame adapted to bear against said plate, means for adjusting tension against the spring.

5. In an instrument of the class described, a main head comprising a frame having a base portion, a point member mounted on said frame and having a working point disposed in operative relation to a working surface engaged by the base portion of the frame, means for resiliently attaching said point to the frame to cause a resilient pressure between the point and the working surface, said means including a slidable plate attached to the point, a spring attached to the frame adapted to bear against said plate, means for adjusting tension against the spring, and further means for locking said slidable plate against vertical movement when desired.

6. In an instrument of the class described, a main head comprising a frame having a base portion, a point member mounted on said frame and having a working point disposed in operative relation to a working surface engaged by the base portion of the frame, means for resiliently attaching said point to the frame to cause a resilient pressure between the point and the working surface, tape holding means on the frame, a tape extending from said tape holding means adjacent to the working surface, a second point member, and means for connecting the tape pivotally with said second point member.

EDGAR E. METCALF.